United States Patent [19]
Tatum

[11] Patent Number: 5,475,942
[45] Date of Patent: Dec. 19, 1995

[54] BOX FOR TRANSPORTING FISH LURE ATTACHED TO FISHING POLE

[76] Inventor: Charles R. Tatum, 120 E. Ave., Naples, Fla. 33963

[21] Appl. No.: 264,907

[22] Filed: Jun. 24, 1994

[51] Int. Cl.⁶ .................................................. A01K 87/00
[52] U.S. Cl. .................................................. 43/25.2
[58] Field of Search .......................... 43/25.2, 4

[56] References Cited

U.S. PATENT DOCUMENTS

| | | |
|---|---|---|
| 2,699,623 | 1/1955 | Pragalz . |
| 2,767,502 | 10/1956 | Reynolds . |
| 3,086,312 | 4/1963 | Davis . |
| 4,452,003 | 6/1984 | Deutsch .................... 43/25.2 |
| 4,771,564 | 9/1988 | Whitley ........................ 43/4 |
| 4,884,357 | 12/1989 | Clifford ..................... 43/25.2 |
| 5,199,208 | 4/1993 | Matchette ................ 43/25.2 |
| 5,233,783 | 8/1993 | Roebuck et al. . |
| 5,235,775 | 8/1993 | Daughtry . |

FOREIGN PATENT DOCUMENTS

| | | | |
|---|---|---|---|
| 732817 | 4/1966 | Canada .................... | 43/25.2 |
| 10931 | 7/1992 | WIPO ..................... | 43/25.2 |

*Primary Examiner*—Kurt Rowan
*Attorney, Agent, or Firm*—Merrill N. Johnson

[57] ABSTRACT

An elongated box for safely transporting or storing a multi-hooked fish lure attached to the line of a fishing pole. The box and its lid are made of non-corrosive plastic material and sized to accommodate the fish lure and the line to which it is attached. A hook is attached to the opposite end of the elongated box from which the line appears. When the fish lure is placed within the box and the lid closed and locked, the hook attached to the box is affixed to a bail on the fishing pole and the line tightened to secure the boxed fish lure to the fishing pole for transportation or storage.

4 Claims, 1 Drawing Sheet

U.S. Patent                    Dec. 19, 1995                    5,475,942
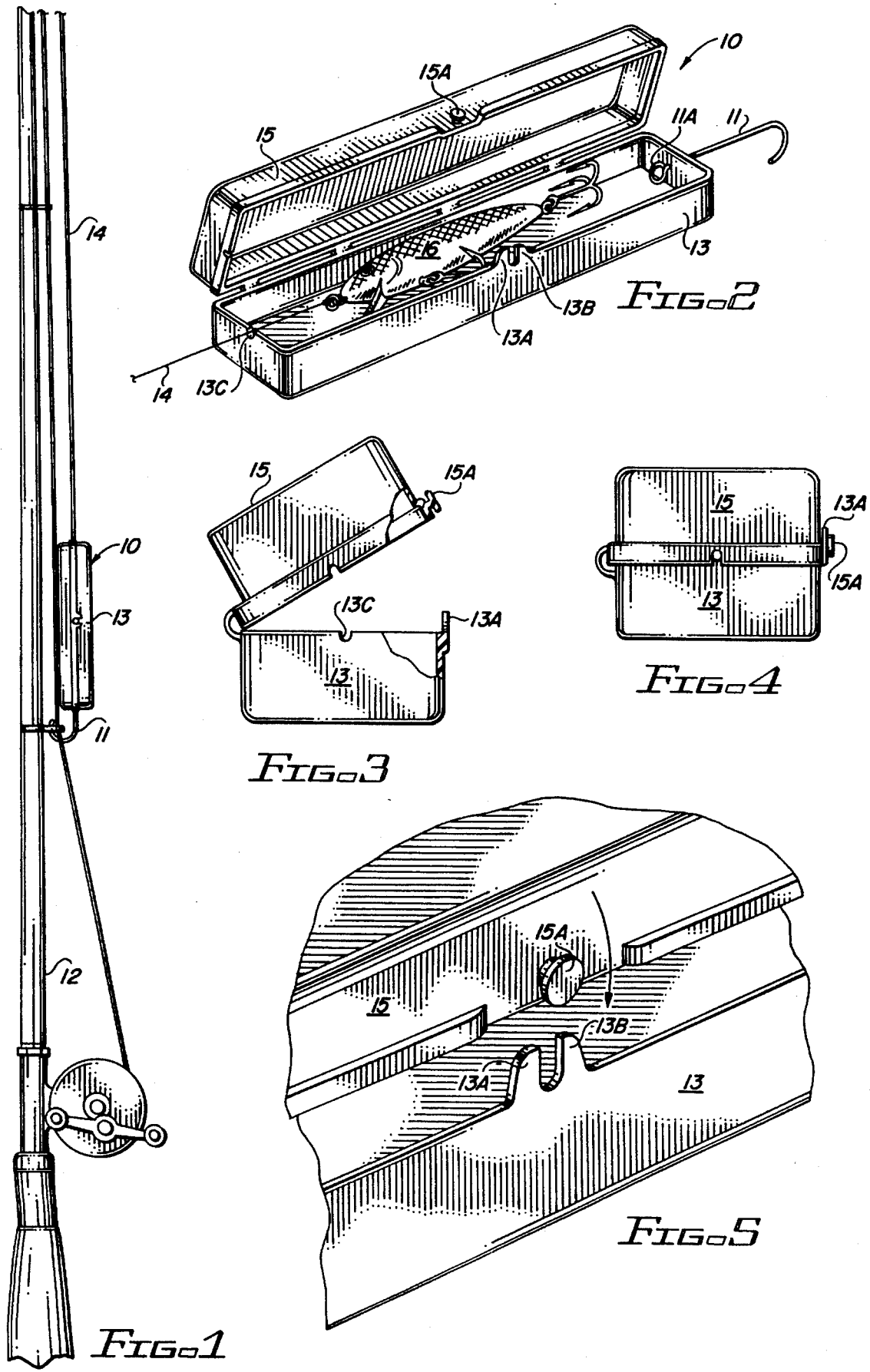

BOX FOR TRANSPORTING FISH LURE ATTACHED TO FISHING POLE

BACKGROUND AND SUMMARY OF THE INVENTION

My invention lies in the field of fishing equipment. More particularly I have invented a device for use by both commercial and sports fishermen to free them from the hazards and annoyance of snagging themselves, their clothing or their equipment with one or more of the hooks on a fish lure attached to the line of a fishing pole when transporting the fishing pole from one location to another.

I am aware that a number of suggestions have been proposed to solve the problem of snagging by hooks or lures on the line of a fishing pole See, for example, U.S. Pat. Nos. 2,699,623; 2,767,502; 3,086,312; 5,233,783 and 5,235,775.

However, so far as I am aware, none of the foregoing suggestions have appeared on the market perhaps because they were impractical or due to the high cost of producing devices according to the teachings of the foregoing patents.

I have invented a very simple and inexpensive device for enclosing a fish lure attached to the line of a fishing pole which device is simply and easily attached securely to or detached from a bail of the fishing pole, so that while the fishing pole is being transported by hand, boat or auto or while the rod is being stored for further use there is no danger of the hooks on the lure being snagged.

My device consists of an elongated plastic box with a hinged lid which locks itself onto the box when the lid is closed. The box is sized to accommodate a fish lure and one end of the elongated box is notched to receive the fishing line attached to the lure. At the opposite end of the elongated box, a metal hook is attached to the box with its curved or hooked end located beyond the end of the box.

When it is desired to transport the fishing pole with a fish lure at the end of the line, my plastic box is opened and the fish lure placed in the box with its line within the notch in the end of the box and the lid closed and locked. Then the hook attached to the opposite end of the box is affixed to one of the bails of the rod and the line tightened to secure the boxed lure onto the fishing pole for safe transportation or storage.

BRIEF DESCRIPTION OF THE DRAWINGS

The appended drawings illustrate of preferred form of my invention in which

FIG. 1 is a perspective view of my device containing a fish lure with the device affixed to a bail of a fishing pole;

FIG. 2 is a perspective view of my device with the lid of the box open showing a fish lure within the box;

FIG. 3 is an elevational view of the end of the box showing the lid open and the notch designed to receive the fishing line.

FIG. 4 is a further elevational view of the end of the box showing the lid closed.

FIG. 5 is a detailed view of the locking mechanism on the lid and the box.

DETAILED DESCRIPTION OF THE PREFERRED EMBODIMENT

Referring to FIGS. 1 and 2 of the drawings, device 10 is shown in FIG. 1 with its hook 11 affixed to one of the bails of fishing pole 12. The fish lure is enclosed within covered and locked box 13 with the fishing line 14 attached to the fish lure disappearing into the end of box 13 opposite the end to which hook 11 is attached.

My device 10 consists of three elements, box 13, lid 15, and hook 11. Box 13 is preferably molded of non-corrosive plastic and in plan view is an elongated rectangle sized to accommodate a multi-hooked fish lure 16. Box 13 may be molded together with lid 15 and the box and lid joined together by a living hinge along one edge of the box.

As best shown in FIG. 2, a preferably stainless steel hook 11 is attached to one end of elongated box 13. Hook 11 may be made by clipping off the barbed end of a conventional fish hook and then the hook is threaded through a small hole in the side of box 13 with the hook firmly fastened to the box by the eye 11A of the hook being unable to pass through the hole in the side of the box.

When lid 15 is closed down onto the upper edge of box 13, two spaced apart upwardly projecting flanges 13A and 13B wrap around button 15A projecting from the front side of lid 15 as best shown in FIG. 5, to lock lid 15 onto box 13 until the box is opened preferably by grasping the box between the thumb and fingers of one hand and the lid between the thumb and fingers of the other hand and pulling the lid up into an open position.

When not in use, device 10 can be stored in most fishermen's tackle box. When the fisherman wishes to move his fishing pole 12 to a new location with lure 16 on the end of his line 14, the fisherman opens box 13 and places lure 16 within the box with line 14 located within a notch 13C best shown in FIG. 2 in the upper edge of the side of box 13 opposite to the side of the box to which hook 11 is attached.

Then the lid 15 is closed and by means of flanges 13A and 13B locking onto button 15A the lid is locked onto box 13. With the lid locked into place, hook 11 is affixed to one of the bails of pole 12 near the pole's attached reel as best shown in FIG. 1.

While I have shown and described a preferred form of my unique device for safely transporting and storing a fish lure attached to the line of a fishing pole, changes and modifications in my device will be apparent to those skilled in the art of fishing equipment. The foregoing description and drawings are not intended to limit or define my invention whose scope is limited only by the following claims.

I claim:

1. A device for transporting a fish lure attached to the line of a fishing pole comprising an elongated rectangular box made of non-corrosive plastic material sized to accommodate a minnow-shaped fish lure attached to the line of a fishing pole, the elongated box having at one end a notch in its upper edge to accommodate the line attached to the fish lure, an unbarbed metal fish hook attached to the opposite end of the box with the curved portion of the hook outside the box, an elongated rectangular lid made of non-corrosive plastic material hingedly attached to the box, and means on the box and lid for locking the lid onto the box as the lid is closed upon the box.

2. A device as set forth in claim 1 in which the means for locking the lid onto the box includes a button projecting from the outside front surface of the lid and a pair of flanges projecting upwardly from the front edge of the box on opposite sides of the button on the lid and sized to engage the button and thereby lock the lid onto the box.

3. A device as set forth in claim 1 in which the hook is made of stainless steel.

4. A device as set forth in claim 1 in which the box and the lid are made from a single mold and their hinge is a living hinge.

* * * * *